(12) United States Patent
Montenegro

(10) Patent No.: US 6,233,688 B1
(45) Date of Patent: May 15, 2001

(54) REMOTE ACCESS FIREWALL TRAVERSAL URL

(75) Inventor: Gabriel Montenegro, Fremont, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 09/109,260

(22) Filed: Jun. 30, 1998

(51) Int. Cl.[7] .................................................. G06F 11/00
(52) U.S. Cl. ............................................................. 713/201
(58) Field of Search .................................. 713/201, 200, 713/202; 707/3, 4, 100, 102; 709/232, 237; 380/25, 29

(56) References Cited

U.S. PATENT DOCUMENTS

| | | | |
|---|---|---|---|
| 5,818,019 | * | 6/1999 | Valencia ........................... 395/200.57 |
| 5,822,539 | * | 10/1998 | Van Hoff ......................... 395/200.66 |
| 5,944,823 | * | 8/1999 | Jade et al. ............................ 713/201 |
| 5,950,195 | * | 9/1999 | Stockwell et al. ....................... 707/4 |
| 5,987,611 | * | 11/1999 | Freund ................................. 713/201 |
| 5,999,979 | * | 12/1999 | Vellanki et al. ....................... 709/232 |
| 6,061,797 | * | 5/2000 | Jade et al. ............................ 713/201 |
| 6,073,176 | * | 6/2000 | Baindur et al. ....................... 709/227 |
| 6,088,796 | * | 7/2000 | Cianfrocca et al. ................... 713/152 |

* cited by examiner

Primary Examiner—Nadeem Iqbal
(74) Attorney, Agent, or Firm—Blakely Sokoloff Taylor & Zafman

(57) ABSTRACT

The invention provides a generic naming scheme for remote access and firewall traversal in the form of a uniform resource locator (RAFT URL). The RAFT URL may be provided to any client, regardless of compatibility with the remote access/firewall traversal method, which then launches an operating environment code module. The operating environment code module performs the remote access/firewall traversal method and interacts with the operating environment to obtain data transport mechanisms. These mechanisms permit the client application to transact with private resources beyond the firewall. The remote access/firewall traversal procedure is made transparent to the client application, and thus, a wider array of client applications may be chosen for the data session with the resources beyond the firewall.

9 Claims, 5 Drawing Sheets

REMOTE ACCESS FIREWALL TRAVERSAL URL

BACKGROUND OF THE INVENTION

1. Field of the Invention

The invention relates generally to the field of computer networking. More specifically, the invention relates to protocols and conventions for computer inter-networking.

2. Description of the Related Art

From within a corporate "intranet" network or a shared private network, the methods and protocols for local area access to computers, devices and data resources within the network is well defined and somewhat uniform, under the control of the administrators of those networks. When users attempt to gain access to those same devices, computers and resources from outside the network, such access is referred to as "remote access". In the past, the most popular physical topology for remote access is a direct dial into a modem bank, which may be at the corporate site or provided for by an ISP (Internet Service Provider). However, this topology impose a heavy administrative burden and monetary cost especially when remote access is attempted through long distance or international toll calls. Thus, there has been a recent trend to provide remote access through an Internet connection. With Internet remote access, the IP (Internet Protocol) connection can be obtained first using any available method, and thus the intranet does not need to maintain a direct physical access point such as a dial-in modem bank. Once a user is "on the Internet" (has achieved an IP connection), a multitude of different protocols and services (limited by the connectivity features of the intranet) can be used on the user's "client" to gain remote access into the intranet. In order to gain remote access, the client must pass the intermediary step, in most cases, of traversing a firewall. The traversal of the firewall can be achieved by using gateway specific software, SSL (Secure Sockets Layer) mechanisms and so on.

Specific client software must have support and awareness of specific firewall traversal methods, and thus generic client software cannot be utilized to penetrate the intranet. For example, a client application such as Netscape™ may not be able to traverse the firewall since it lacks the means with which to express entry parameters to "support" the private intranet's firewall scheme. Thus, users are often limited to using software that specifically understands and communicates with the intranet. This restricts the choice of client software greatly such that only a limited set of client applications out of all the multitude of programs available can be used when accessing that private intranet.

These schemes typically tie the firewall access mechanism to the application, instead of making it transparent by placing it inside the underlying networking support. There is a need for general naming mechanism in order to separate application from firewall traversal mechanisms. Furthermore, the firewall has no standard format to download traversal configuration into the client after authentication.

Thus, there is a need for a generic scheme for allowing client applications to be transparent to the remote access and firewall traversal procedure. The scheme should permit any type of remote access/firewall traversal and security method/protocol to be recognized and operated independent of the client application.

SUMMARY OF THE INVENTION

The invention provides a generic naming scheme for remote access and firewall traversal in the form of a uniform resource locator (RAFT URL). The RAFT URL may be provided to any client application, regardless of compatibility with the remote access/firewall traversal method, which then launches another executable module. The executable module performs the remote access/firewall traversal method and interacts with the operating environment to obtain data transport mechanisms. These mechanisms permit the client application to transact with private resources beyond the firewall. The remote access/firewall traversal procedure is made transparent to the client application, and thus, a wider array of client applications may be chosen for the data session with the resources beyond the firewall.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
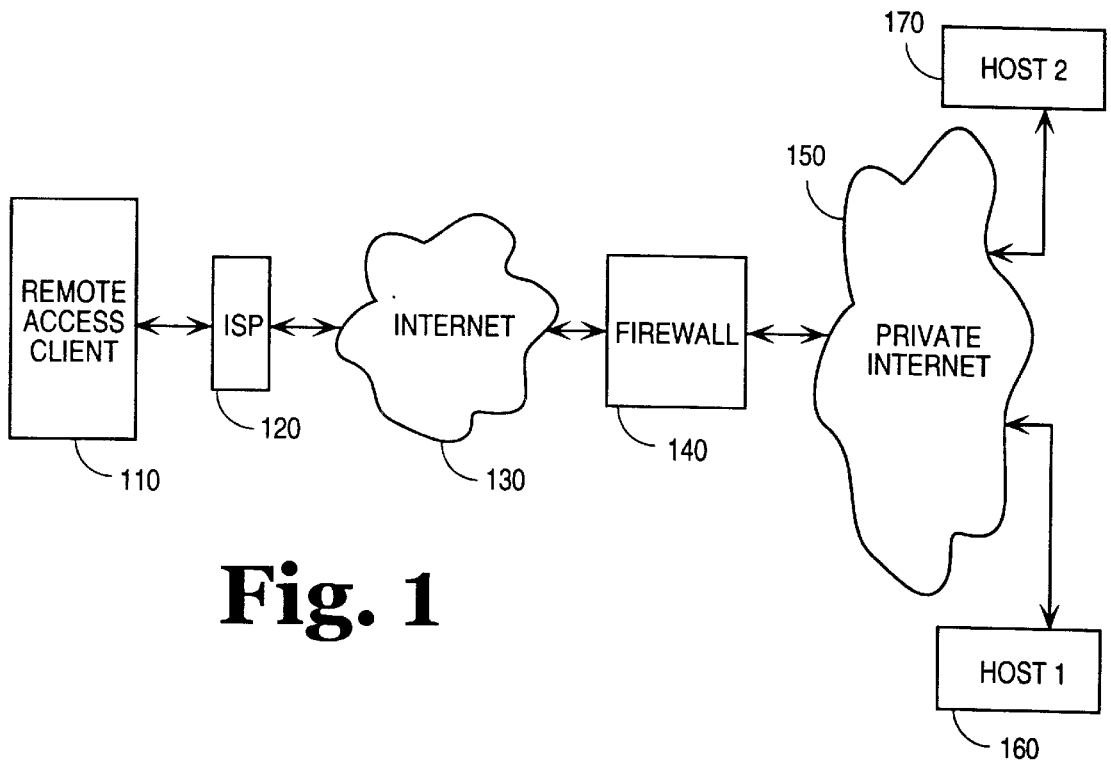
FIG. 1 illustrates the topology of remote access to a private intranet.

FIG. 1 illustrates the topology of remote access to a private intranet.

Internet-based remote access may involve many different entities which intervene between a remote access client 110 and hosts such as host 160 and host 170. Remote access client 110 may consist of a computer system or PDA (Personal Digital Assistant) or other information device that has the capability of being connected to a network. Remote access client 110 may also execute software configured to enable the access of services such as FTP (File Transfer Protocol), POP (Post Office Protocol), HTTP (HyperText Transfer Protocol), etc. One way of "getting on the Internet" to commence the remote access session with one or more hosts 160 and 170 is to dial-up to an ISP (Internet Service Provider) whose internal routers and switches provide a TCP/IP (Transport Control protocol/Internet Protocol) connection to remote access client 110. With the "Internet connection thus obtained, the remote access client 110 can reach any computer connected to the "Internet" 130 which is well-known in the art. The ISP dial-up method of Internet access described above is merely exemplary of many ways a connection to the Internet may be obtained.

Once on the Internet 130, remote access client 110 is free to access services provided by any computers or networks connected to the Internet 130 such as an HTTP service (i.e., a web site). However, the below description restricts itself to using the Internet to gain remote access into a private network or intranet 150 by means of the Internet. Once remote access into the intranet 150 is established, remote access client 110, services provided for within the intranet 150 may be accessed. What distinguishes the intranet 150 from an ordinary web server or FTP server on a more public network is the security and isolation that can be provided by a gateway or firewall 140. One function of firewall 140 is to prevent unauthorized access into the intranet by users/ computers connected to the Internet 130.

To control and configure access to the intranet 150 through firewall 140 many various firewall protections or security schemes have been developed such as IP security schemes using SKIP (Simple Key Management for Internet Protocols), or ISAKMP (Internet Security Association and Key Management Protocol), SSL (Secure Sockets layer), etc. Many of these schemes are conflicting and standardization has not been successfully achieved. One reason for the failure of standardization is the nature of remote access—it is intended for a specific often closed set of users. For instance, a company X may desire that only certain key employees have remote access to the intranet of X. In that case, company X will choose whatever method of remote access security is easy to implement or whatever method is decided on as best for the type of information served. Since the choice of remote access security methodology is isolated to the company implementing it, standardization is difficult. In a more public network such as the Internet standardization is easy to achieve since the many nodes of the network desire compatibility with the other.

Lack of standardization limits the remote access client's 110 choice of remote access security methods when using software to access services provided by the intranet.

The invention in its various embodiments permits the use of a wider range of client software to access the intranet 150. A naming scheme is provided which when used by client software will cause the client 110 to negotiate remote access. The naming convention is generalized so that any of the conventional security methods can be adequately identified. In one embodiment, the client software parses a RAFT URL (Remote Access Firewall Traversal Uniform Resource Locator) and executes code that extends the ability of the underlying operating system of remote access client 110 to negotiate access according to the RAFT URL. The invention in certain embodiments makes transparent the process of firewall traversal. This transparency will allow the use of application software that is not restricted by or concerned with the remote access security and traversal method.

Figure 2:
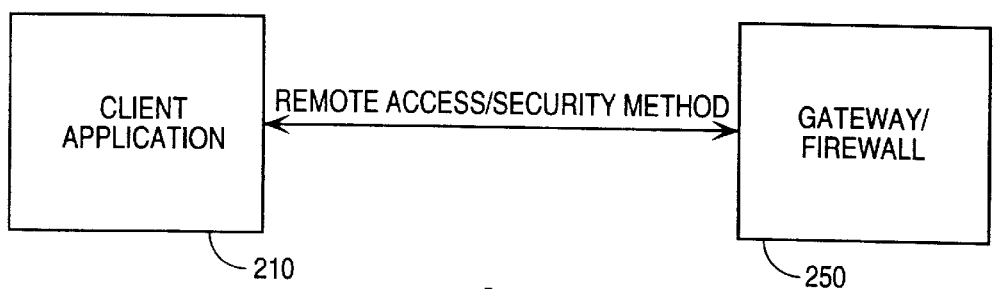
FIG. 2 illustrates a traditional remote access scheme.

Currently, there is no transparency between the procedure of firewall traversal for remote access and the client application software used to thereafter access the services provided by the intranet beyond the firewall, if the traversal method uses application layer traversal mechanisms. FIG. 2 illustrates this prior art model of application dependency upon the remote access security method. A client application 210 is executed on a system somewhere outside in a topology sense from the firewall 250 and intranet.

In traversal methods like httpstunneling, client application 210 must be an application specifically aware and capable of the remote access security and traversal method. The particulars of this method are predefined by the gateway 250 and cannot be modified. As such, if an application such as a web browser does not have built-in support for the remote access method, it will be unable to gain remote access. The process of attaining remote access and/or traversing a firewall is thus, within the purview of the client application in application layer transversal mechanisms.

The RAFT URL mechanism of the invention provides benefits application or session layer traversal mechanisms that imply client software modifications. The RAFT URL provides a universal language to denote what these modifications are. It promotes the standardized use of these mechanisms as a consistent set of functions that become a service to client applications rather than an inherent part of them.

For firewalls in general, RAFT URLs provides a universal language that aids in unifying firewall technology. Currently, some firewalls are based on session layer or application layer mechanisms (application layer gateways or ALGs), whereas other firewalls operate at lower layers, in a much more transparent (to applications) fashion, i.e., IPSEC firewalls, network layer tunneling firewalls. RAFT allows these firewall technologies to be treated in a similar fashion, and to allow their integration and tracking within one single mechanism.

Figure 3:
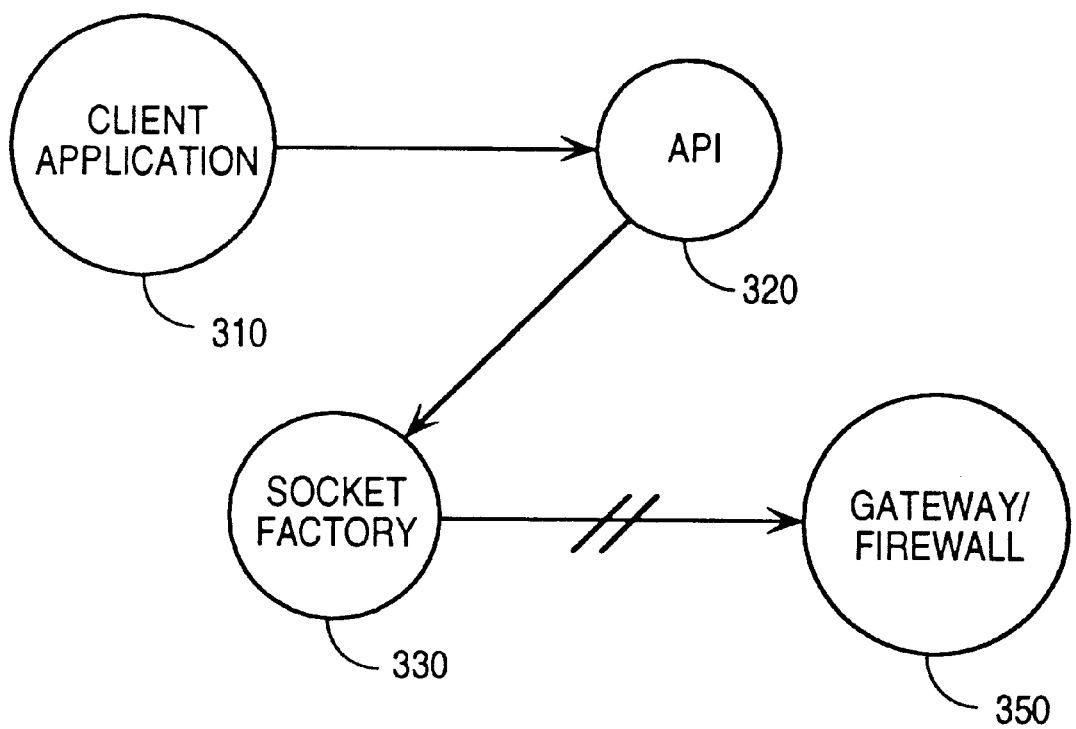
FIG. 3 is a logical diagram of one embodiment of the invention.

FIG. 3 is a logical diagram of one embodiment of the invention.

Unlike the prior art model of FIG. 2, the client application 310 does not have the responsibility of directly securing remote access. Rather, the client application 310 makes use of a socket factory 320 (Application Program Interface) to access a system resource such as sockets. The socket factory 320 negotiates security and access to gateway/firewall 350. The socket factory is configured to understand the naming convention (RAFT URL) and then initiate steps to obtain remote access, which includes the negotiation of security protocols defined by the RAFT URL. The RAFT URL is input either by user or by preference setting to the client application 310. The socket factory recognizes the RAFT URL (see FIG. 5) and configures itself 330 to communicate with gateway/firewall 350.

This socket factory 320 can be made available to any other client application as well, such as a client application 315 or 312. Like client application 310, client applications 312 do not need to be compliant or compatible with the firewall security method. When client applications 312 or 315 obtain sockets via the socket factory, these applications will inherit the same behavior as provided in the sockets to transmit/receive information from gateway/firewall 350. Once the socket factory has successfully gained access beyond the firewall, the sockets derived from the socket factory 330 provide presentation layer data transport mechanisms to client application 310.

Client application 310 (or 312 or 315) would be unaware, except for the obtaining of behavior from the sockets of the firewall traversal. Once client application 310 has obtained the right to transact via the sockets mechanism to gateway/firewall 350, other applications 312 and 315 can use sockets in a similar fashion to communicate beyond the firewall 350. The traversing of the firewall is divorced from the client application 310 and made the responsibility of the socket factory 320. In so doing, traversal of the firewall and its security method is made transparent to client applications 310, 312 and 315. Unlike the prior art of FIG. 2, this permits the client application to be less specific to the firewall.

Figure 4A:
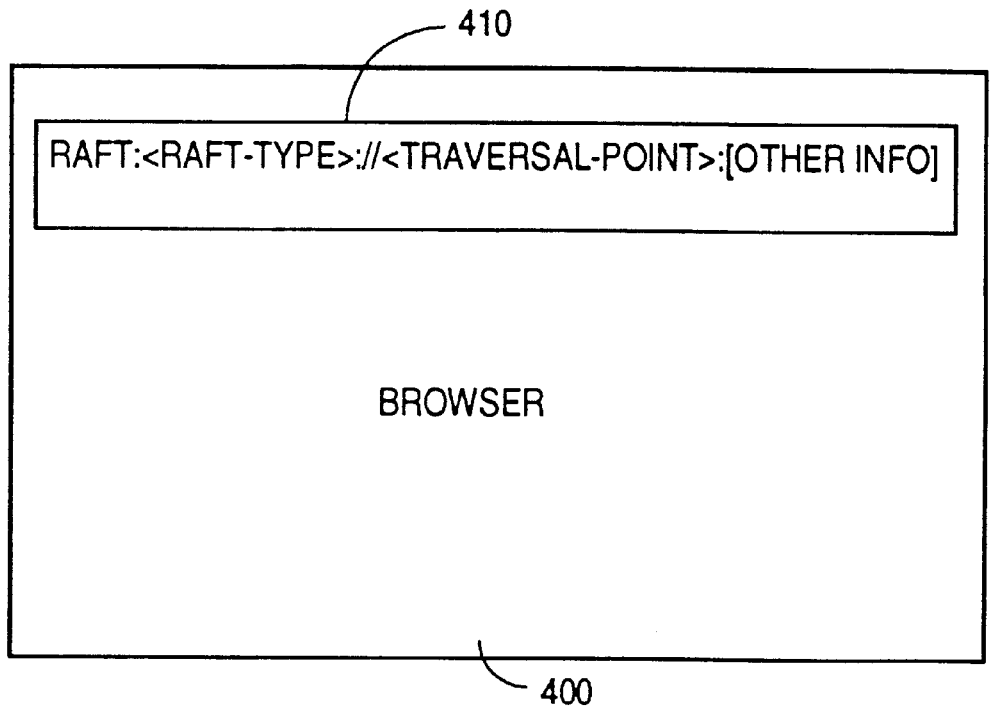
FIG. 4a illustrates a RAFT URL according to one embodiment of the invention.

FIG. 4a illustrates a RAFT URL according to one embodiment of the invention.

The RAFT URL is a naming scheme generic to the various firewall traversal and remote access security methods. Whatever method the particular firewall designates, the RAFT URL has a structure that can contain identifiers for the underlying implementation (socket factory in the Java case) to handle its negotiation.

FIG. 4a shows a system application 400 like one used to configure the socket factory which accepts as input or can store as preference a RAFT URL 410. Unlike an ordinary URL, the RAFT URL does not point to a data object or data creator. Rather, it designates the means to negotiate firewall access which includes specifying security methods either implicitly or explicitly. In one embodiment, the RAFT URL 410 has the following components:

"raft"—indicates the identifying information to follow are handles to configure remote access. Unlike "http:" or "ftp:" of an ordinary URL which identifies a data transfer protocol or service, the "RAFT:" designation can serve to launch or call the remote access mechanism.

"raft-type"—designates the particular name given to a specific firewall traversal or remote access method. For instance, the use of layer 3 tunneling with SKIP (Simple Key-Management for Internet Protocols) or tunneling through the firewall using SSL.

"traversal point"—indicates the IP address, domain name or other location of the firewall, gateway, or remote access server with which the client system must negotiate access, the traversal point will be known to an authorized user or can be provided through some other means through authentication.

"other-info"—indicates a security scheme specific initialization string such as a password, user name or even a secondary security mechanism. The parameter is optional with its format defined wholly by the scheme and firewall's policy.

"generic-URL"—allows regular URL's of the "http:" or "ftp:" variety.

Figure 4B:
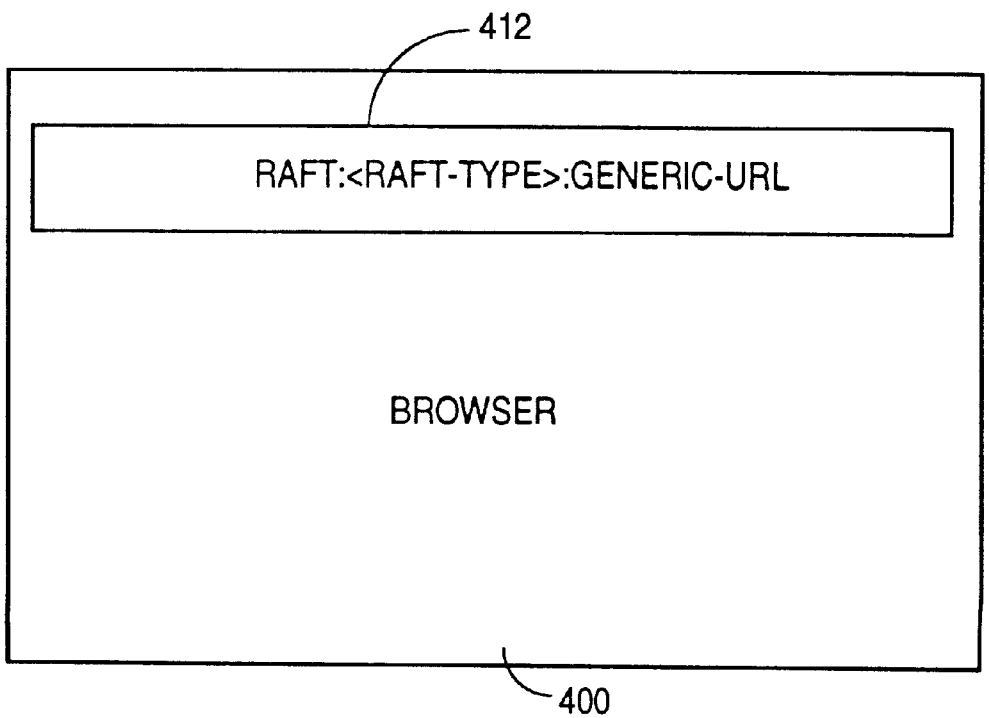
FIG. 4b illustrates a RAFT URL according to another embodiment of the invention.

FIG. 4b illustrates a RAFT URL according to another embodiment of the invention.

Like FIG. 4a, both the designation of "raft:" and a raft-type are provided. Instead of a traversal point, a generic-URL parameter terminating it. Such an embodiment for the RAFT URL may be used in https or secure http protocols, where the "https" URL designates the entry point through the firewall.

Implementation for Specific Schemes

Described in a listing of desirable implementations of the RAFT URL for specific remote access and firewall traversal schemes. The RAFT URL concept presented in its various embodiments permits any type of scheme to be designated.

1. SSL Tunneling

The RAFT URL for SSL tunneling would take the form "raft:sslt:https://x" where x may designate a host port or server address, directory path and search/cgi (common gateway interface) or file name parameters.

2. Mobile IP Firewall Traversal

The RAFT URL for firewall traversal by mobile IP (Internet Protocol) would take the form "raft:mip://traversal-point" with an optional terminating string ";type=y", where y refers to either the "SKIP" (Simple Key Management for Internet Protocols) security protocol or IP security protocols.

3. Remote Access Using TSP

The RAFT URL for remote access using TSP (Tunneling Set-up Protocol) takes the form "raft:tsp://x" where x includes a traversal point and optional ";type=y" terminating parameter. Y may be either "ipsec" or "skip" as defined for Mobile IP access in part 2 above.

For instance, consider the following RAFT URL" "raft:sslt:https://firewall.foo.com/access.html". This RAFT URL indicates that remote access through the firewall named/addressed as "firewall.foo.com" is to be achieved using secure http by processing the page "access.html" which may be an interactive login page where a user enters login information such as a user name and password for further entry beyond the firewall.

The RAFT URL is useful due to its versatility; any type of remote access may be designated and specified. A second feature of the invention lies in the processing of the RAFT URL in a manner transparent to the client data application.

Figure 5:
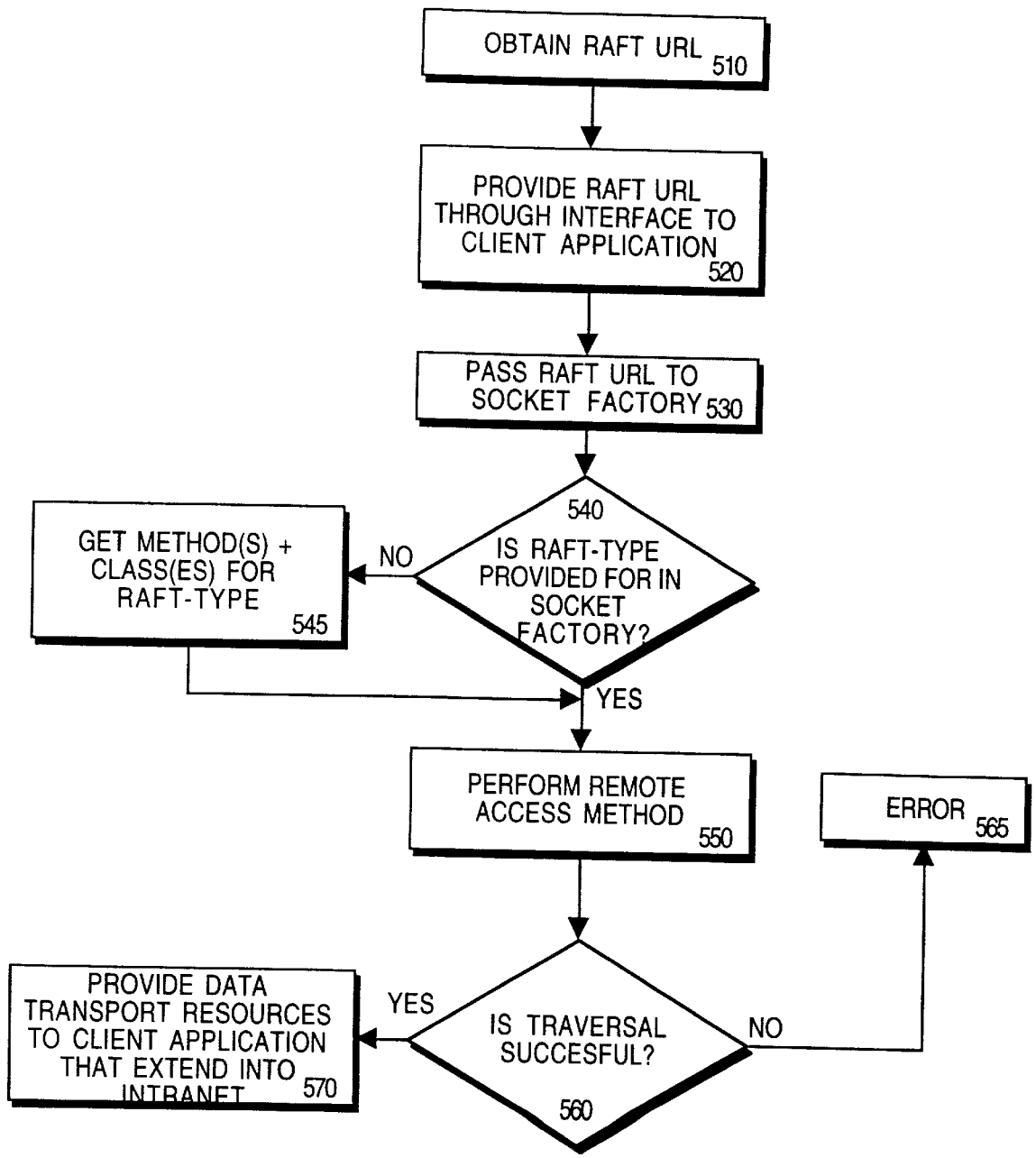
FIG. 5 is a flow diagram of RAFT URL processing according to one embodiment of the invention.

FIG. 5 is a flow diagram of RAFT URL processing according to one embodiment of the invention.

The first step in creating a transparency between the firewall traversal for remote access and the client application is to obtain the appropriate RAFT URL (step 510). The discovery of the specific RAFT URL to use is not a subject of the essential invention. Obtaining a RAFT URL may be achieved in several ways: (1) obtaining it in person from a system administrator, (2) visiting a special web page where an authenticated user may retrieve the appropriate RAFT URL from the firewall, (3) querying a directory service such as LDAP (Lightweight Directory Access Protocol) or (4) may be preconfigured into the client application or system. The appropriate RAFT URL will designate parameters allowing the client system to get private intranet resources through its data transport mechanisms (IP stack, sockets, etc.).

Assuming that the RAFT URL is obtained, it is then provided through some interface to the client application (step 520). This interface may be URL data entry dialog of a browser or be chosen from a menu by the user. The RAFT URL may already be provided to the client application by being set-up in a preference manager for the client application or in an operating system registry intended to service that client application. When so provided, the RAFT URL is passed to the socket factory (in Java) (step 530) that will execute methods needed to perform the firewall traversal procedure.

If the specific "raft-type" (type of firewall traversal and/or remote access security, see above) is not provided for in the socket factory, by way of methods, functions, classes and/or code that can be executed, then the required methods, functions, classes, code, etc. must be obtained. In that case, the firewall traversal procedure first gets the needed methods, classes, etc. for the raft-type. These methods, classes, etc. may be obtained from the firewall itself and then loaded as an API (Application Program Interface) or mobile code, such as Java applet, onto the client system. If the required methods, classes, etc., to undergo processing of the "raft-type" is available or made available then the remote access method is performed (step 550). The remote access and/or firewall traversal method, as specified by the "raft-type" parameter of the RAFT URL, need not be known or compatible with the client application(s) ultimately handling the data transactions with resources beyond the firewall. This responsibility and restriction is removed to the socket factory.

If the traversal or remote access is successful (checked at step 560), the data transport resources are provided to the client application that extend into the intranet (step 570). The data transport resources may be sockets, a TCP/IP stack or other presentation/transport layer mechanisms which facilitate data transport between the client system and resources such as servers existing in the intranet beyond the firewall. Access is regulated by and monitored by the firewall. The interaction between the API/applet and the obtained data transport resource is dependent upon platform and operating system and will vary from system to system.

For example, consider a mobile network computer system based upon Java. Such a computer system typically uses a socket factory to create network data transport resources (called sockets). These sockets allow applications to transact data over a network such as the Internet. Currently, firewall traversal and remote access security operates above this transport layer on the application layer. As a consequence, the choice of client applications restricted when transacting data within an intranet beyond the firewall since compatibility is required. SSL attempts to generalize secure access but does so on the application level and thus, the client application too must be SSL compatible. Further, if SSL is not offered by the firewall as the secure access method, then SSL fails to be a general solution which will be adequate for every firewall traversal and remote access security situation. In the Java based mobile computer system, the invention, in one embodiment, would operate to set the socket factory according to parameters in the RAFT URL. Client applications that use the standard network resources Java application (known as java.net) can also be divorced from having to include the methods, functions, classes, etc. needed to perform remote access in accordance with the RAFT URL. Rather, a system applet would parse the RAFT URL and set the socket factory by adding methods, functions, classes (if not already present) and then allow the socket factory to handle the firewall traversal and remote access. If a client application wishes directly control its remote access security scheme, it may directly add the required behavior (methods, functions, classes, etc.) to configure its use of the socket factory provided for in the operating system. The actual negotiation of remote access or firewall traversal is made transparent to the application layer, which takes advantage of data transport resources after firewall traversal is successfully complete.

The above example refers to a Java-based mobile computing platform. However, the invention, in its various embodiments, is not limited to any platform or operating environment. An application or other network data transport resource can be provided with the means to accept and parse the RAFT URL and then carry out the identified remote access procedure. If the remote access behavior is not available to the operating system, it may be obtained automatically by the application.

Figure 6:
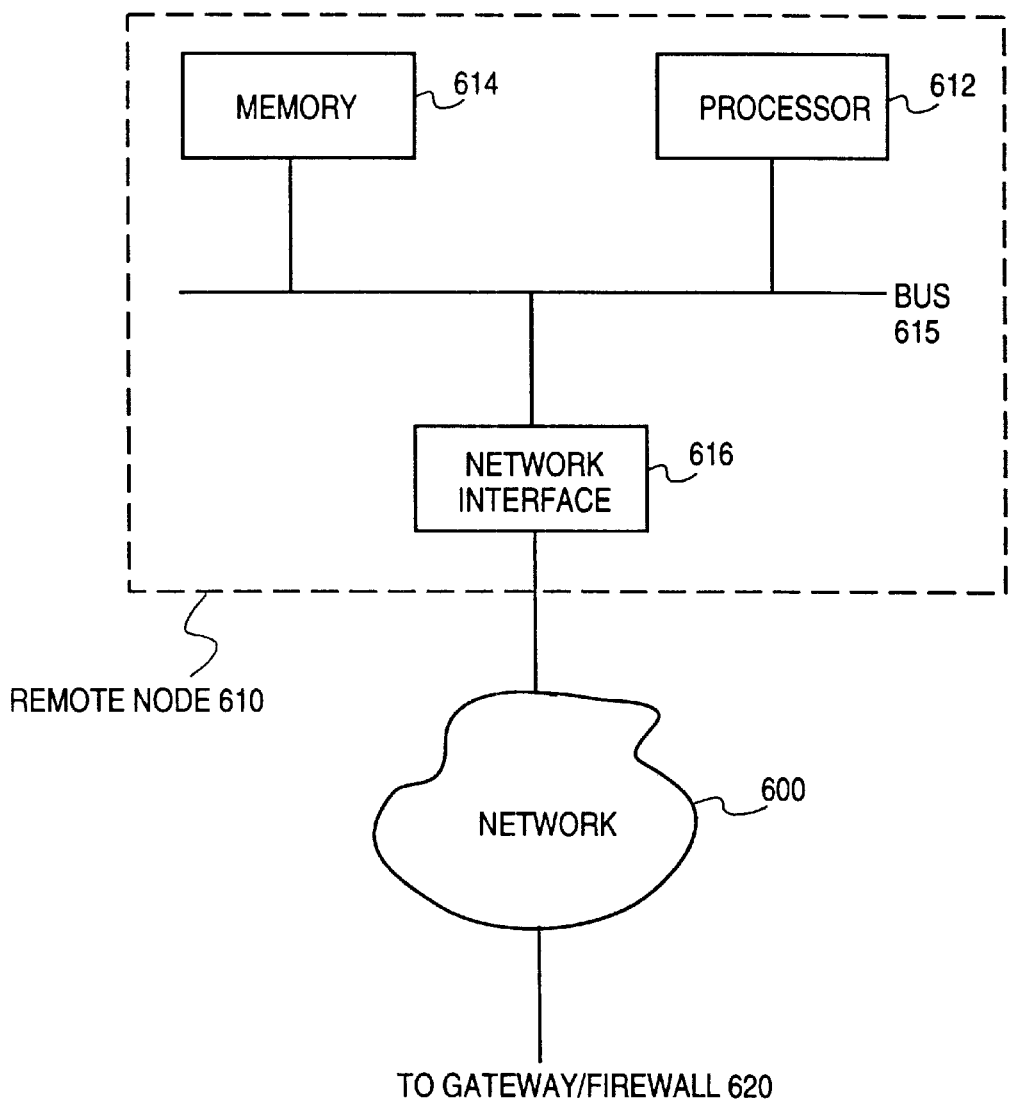
FIG. 6 is a diagram of one embodiment of the invention.

FIG. 6 is a diagram of one embodiment of the invention.

A RAFT URL mechanism would allow a remote node 610 to traverse into gateway/firewall. Remote node 610 is illustrative of a computer system or information device that desires remote access to a private or other network that lies beyond the firewall. Remote node 610 may be connected to gateway/firewall via a network 600 such as the Internet.

Remote node 610 may be composed of a variety of devices, including a memory 614 and a processor 612 coupled directly to each other and through a bus 615. Bus 615 may also attach a network interface card 616 to both memory 614 and processor 612. Network interface card 616 connects the remote 610 to network 600 and allows remote node 610 to transact data to and from network 600 and consequently, to and from other nodes that may be connected to network 600 such as the gateway/firewall. A RAFT URL that identifies the firewall and its security access scheme may be provided to remote node 610 in a variety of ways, including transmission over network 600. Once the appropriate RAFT URL is provided to remote node 610 the RAFT URL is passed to a socket factory generated by some application running in memory 614 and executed by processor 612. The processor 612 is configured (by instructions provided thereto) to parse the RAFT URL and initiate the appropriate client events on remote node 610 for traversal of gateway/firewall 620. Once remote access is granted to remote node 610, it is free to transact data with resources beyond the firewall 620. This data transaction is handled by network interface 616 which may modify data packets with any security-related headers or encapsulation demanded by the RAFT URL's designation.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method of remote access comprising:

providing a remote access firewall traversal (RAFT) uniform resource locator (URL) to a client, said RAFT URL indicating a mode of remote access through a firewall; and configuring said client to negotiate access to a private resource protected by said firewall based on parameters specified by said RAFT URL that allow said client to access said private resource through its data transport mechanisms.

2. A method according to claim 1 wherein the step of recognizing a RAFT URL includes the steps of:

identifying a RAFT service;

identifying a RAFT type, said RAFT type denoting a specific remote access method.

3. A method according to claim 2 wherein the step of recognizing a RAFT URL further includes the steps of:

identifying a generic uniform resource locator.

4. A method according to claim 2 wherein the step of recognizing a RAFT URL further includes the steps of:

identifying a traversal point.

5. A method according to claim 4 wherein the step of recognizing a RAFT URL further includes the steps of:

identifying a scheme-specific initialization string.

6. A method according to claim 1 wherein the step of configuring includes the steps of:

building sockets from a socket factory in accordance with said RAFT URL; and passing the behavior of said sockets from said socket factory to application on said client, said application able to traverse said firewall with the appropriate method.

7. A method according to claim 6 further comprising the step of:

obtaining methods and classes for a raft-type specified in said RAFT URL if said raft-type is not provided for by said socket factory.

8. A method according to claim 2 further comprising the step of:

performing said specific remote access method, and if said performing is successful, providing data transport resources that extends to said private resource to said client.

9. A computer readable medium comprising:

instructions when executed by a processor cause said processor to provide remote access firewall traversal, said instructions including a remote access firewall traversal (RAFT) uniform resource locator (URL, said RAFT URL indicating a mode of remote access through a firewall.

* * * * *

UNITED STATES PATENT AND TRADEMARK OFFICE
CERTIFICATE OF CORRECTION

PATENT NO. : 6,233,688 B1
DATED : May 15, 2001
INVENTOR(S) : Montenegro

It is certified that error appears in the above-identified patent and that said Letters Patent is hereby corrected as shown below:

Title page,
Item [56], References Cited, U.S. PATENT DOCUMENTS, please delete "5,818,019" and insert -- 5,918,019 --

Signed and Sealed this

Third Day of May, 2005

JON W. DUDAS
*Director of the United States Patent and Trademark Office*